US009069052B2

(12) United States Patent
Hsu et al.

(10) Patent No.: US 9,069,052 B2
(45) Date of Patent: Jun. 30, 2015

(54) DETERMINING THE PHYSICAL LOCATION OF A CLIENT (71) Applicant: Alibaba Group Holding Limited, George Town (KY)

(72) Inventors: Tai-Ching Hsu, Santa Clara, CA (US); Sihai Hu, Hangzhou (CN); Leishi Xu, Hangzhou (CN)

(73) Assignee: Alibaba Group Holding Limited (KY)

( * ) Notice: Subject to any disclaimer, the term of this patent is extended or adjusted under 35 U.S.C. 154(b) by 244 days.

(21) Appl. No.: 13/625,428

(22) Filed: Sep. 24, 2012

(65) Prior Publication Data

US 2013/0080598 A1 Mar. 28, 2013

(30) Foreign Application Priority Data

Sep. 26, 2011 (CN) .......................... 2011 1 0288791

(51) Int. Cl.

| G06F 15/16 | (2006.01) |
|---|---|
| G01S 5/00 | (2006.01) |
| G01S 5/14 | (2006.01) |
| G01S 13/76 | (2006.01) |
| H04L 29/12 | (2006.01) |
| H04L 29/08 | (2006.01) |
| H04L 12/24 | (2006.01) |
| H04L 12/26 | (2006.01) |

(52) U.S. Cl.
CPC ........... *G01S 5/0009* (2013.01); *H04L 43/0817* (2013.01); *H04L 43/0864* (2013.01); *G01S 5/14* (2013.01); *G01S 13/76* (2013.01); *H04L 61/609* (2013.01); *H04L 67/18* (2013.01); *H04L 43/0852* (2013.01); *H04L 41/12* (2013.01)

(58) Field of Classification Search
USPC ......... 709/217, 218, 219, 220, 221, 222, 223, 709/224, 225, 226, 227, 228; 370/254, 255, 370/280, 328, 329, 330, 338, 342, 350, 400, 370/402; 455/456.1, 404.2, 67.11
See application file for complete search history.

(56) References Cited

U.S. PATENT DOCUMENTS

| 6,397,249 | B1 | 5/2002 | Cromer et al. |
| 7,170,447 | B2 | 1/2007 | Riley et al. |
| 7,251,493 | B2 * | 7/2007 | Camp et al. ................ 455/456.1 |
| 7,898,977 | B2 | 3/2011 | Roese et al. |
| 8,340,682 | B2 | 12/2012 | Taylor et al. |
| 8,369,242 | B2 | 2/2013 | Potkonjak |

(Continued)

FOREIGN PATENT DOCUMENTS

CN 101399713 4/2009

*Primary Examiner* — Saket K Daftuar
(74) *Attorney, Agent, or Firm* — Van Pelt, Yi & James LLP (57) ABSTRACT Determining a physical location of a client, including: determining a network transmission time associated with a first server and a network transmission time associated with a second server; determining a set of key parameters for the first server and a set of key parameters for the second server; determining a distance between the client and the first server and a distance between the client and the second server based at least in part on inputting the network transmission time associated with the first server, the network transmission time associated with the second server, the set of key parameters for the first server, and the set of key parameters for the second server into a data processing model; and determining the physical location associated with the client using the distance between the client and the first server and the distance between the client and the second server.

19 Claims, 6 Drawing Sheets

(56) References Cited

U.S. PATENT DOCUMENTS

| | | | |
|---|---|---|---|
| 8,417,264 B1* | 4/2013 | Whitney et al. | 455/456.6 |
| 8,437,742 B2* | 5/2013 | Garskof | 455/411 |
| 8,525,681 B2* | 9/2013 | Gehrke et al. | 340/573.4 |
| 8,532,026 B2* | 9/2013 | Osborn | 370/328 |
| 8,792,910 B2* | 7/2014 | Qiu et al. | 455/456.2 |
| 8,966,088 B2 | 2/2015 | Wilf et al. | |
| 2002/0016831 A1* | 2/2002 | Peled et al. | 709/219 |
| 2004/0137911 A1* | 7/2004 | Hull et al. | 455/456.1 |
| 2005/0101331 A1 | 5/2005 | Tamaki et al. | |
| 2005/0181810 A1* | 8/2005 | Camp et al. | 455/456.6 |
| 2007/0041335 A1 | 2/2007 | Znamova et al. | |
| 2008/0014964 A1* | 1/2008 | Sudit et al. | 455/456.1 |
| 2009/0028092 A1 | 1/2009 | Rothschild | |
| 2010/0150117 A1 | 6/2010 | Aweya et al. | |
| 2010/0278178 A1* | 11/2010 | Sridhar et al. | 370/390 |
| 2011/0188510 A1* | 8/2011 | Kikuchi et al. | 370/412 |
| 2011/0314144 A1* | 12/2011 | Goodman | 709/224 |
| 2012/0005353 A1* | 1/2012 | Edecker et al. | 709/227 |
| 2012/0102169 A1* | 4/2012 | Yu et al. | 709/223 |
| 2012/0281565 A1 | 11/2012 | Sauer | |

* cited by examiner

DETERMINING THE PHYSICAL LOCATION OF A CLIENT

CROSS REFERENCE TO OTHER APPLICATIONS

This application claims priority to People's Republic of China Patent Application No. 201110288791.9 entitled METHOD AND DEVICE FOR OBTAINING THE TRUE PHYSICAL ADDRESSES OF NETWORK CLIENTS filed Sep. 26, 2011 which is incorporated herein by reference for all purposes.

FIELD OF THE INVENTION

The present application relates to the field of network technology. In particular, it relates to techniques of determining physical locations of network clients.

BACKGROUND OF THE INVENTION

In some network application environments, it is useful to determine the physical locations of network clients (or rather, the network users that use such network client devices). For example, at e-commerce websites, activities performed by network clients with concealed geographic locations are highly correlated to fraudulent transactions. As such, it would be advantageous to accurately determine the physical locations of network clients to compare such locations to the addresses provided by the users at the clients to prevent undesirable conduct such as fraud. For example, if the determined physical location of a network client did not match the address provided by a user at the client, then fraud may be detected.

Conventionally, a common technique for determining the physical locations of network clients relies on the network client's internet protocol (IP) address. The IP address is looked up in an IP address-geographic location mapping table and the physical location is thus determined. However, the IP address is not always a reliable basis on which to determine the physical location of a network client because a user may conceal or change his or her own real IP address through various means (e.g., through using proxy services).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining a physical location of a network client is described. In some embodiments, to determine the physical location of a network client, the client is caused to communicate with at least two servers. The physical location of each such server is known. For example, the physical location of a server may be represented as a coordinate in three-dimensional space, a longitudinal and latitudinal coordinate, or as a global positioning system (GPS) coordinate. In some embodiments, a client sends a request for data from a first server. Then the first server sends the requested data back to the client and such data causes the client to send a request message to at least a second server. In some embodiments, the physical location of each of the servers is known. In some embodiments, the total network transmission time associated with the first server sending data to the client, then the client sending a request message to a second server is referred to as the "bi-directional network transmission time" associated with that second server. In some embodiments, one or more key parameters associated with the network congestion status of each server are determined for each server to which the client has sent a request message. Network congestion status of a server describes how occupied a server is with respect to all the traffic that it is handling, including engaging in data transmissions with the client. For example, because the transmission time of communication between a server and the client may be affected by the server's network congestion status, computing the network congestion status gives further context to the bi-directional network transmission time. In some embodiments, once the bi-directional network transmission time and the key parameters are determined for each of the at least two servers, such values may be input into one or more data processing models (e.g., which are trained using historical data) for the data processing model(s) to output a likely distance between the client and each server. These at least two distances between the client and each respective server may be used to determine a physical location of the client.

Figure 1:
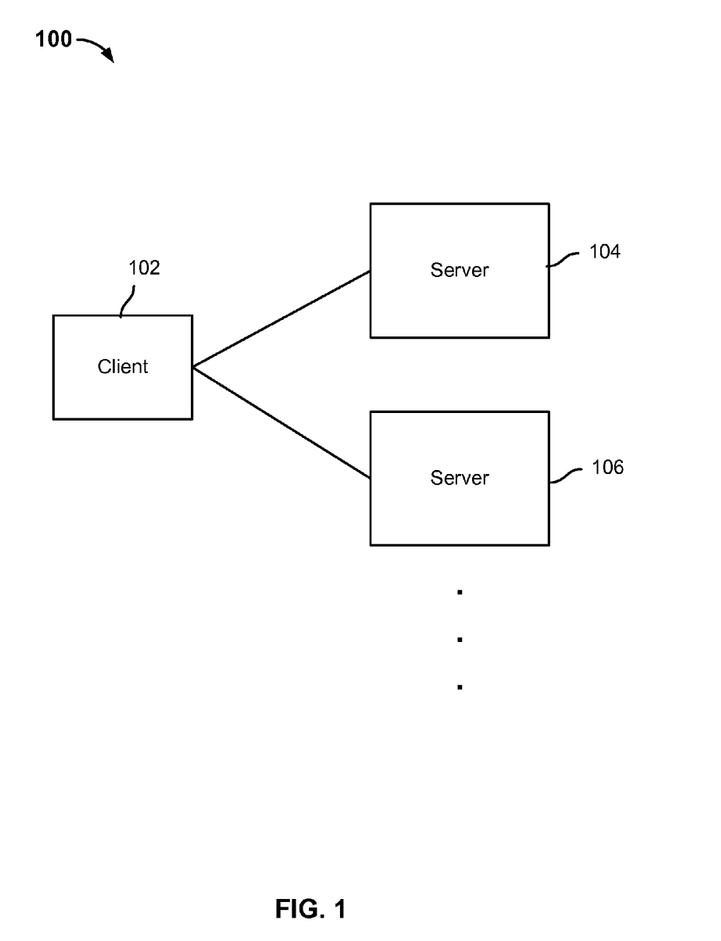
FIG. 1 is a diagram showing a system of a client and at least two servers.

FIG. 1 is a diagram showing a system of a client and at least two servers. In the example, system includes client 102, server 104, and server 106. In some embodiments, system 100 may include servers additional to servers 104 and 106. In some embodiments, regardless of the number of servers in system 100, the physical location of each server is known in advance. Given that at least the physical location of each of the servers is known in advance, the physical location of client 102 may be determined based at least in part on establishing communication between client 102 and each server instead of relying on an IP address of client 102.

In some embodiments, client 102 may be remote to either or both of servers 104 and 106. In some embodiments, client 102 may communicate with either or both of servers 104 and 106 over a network comprising high-speed data networks and/or telecommunication networks. In some embodiments, either or both of servers 104 and 106 may communicate with clients other than client 102. In some embodiments, servers 104 and 106 both have the same system time.

Some embodiments of determining the physical location of client 102 will be described with process 200 of FIG. 2 below.

Figure 2:
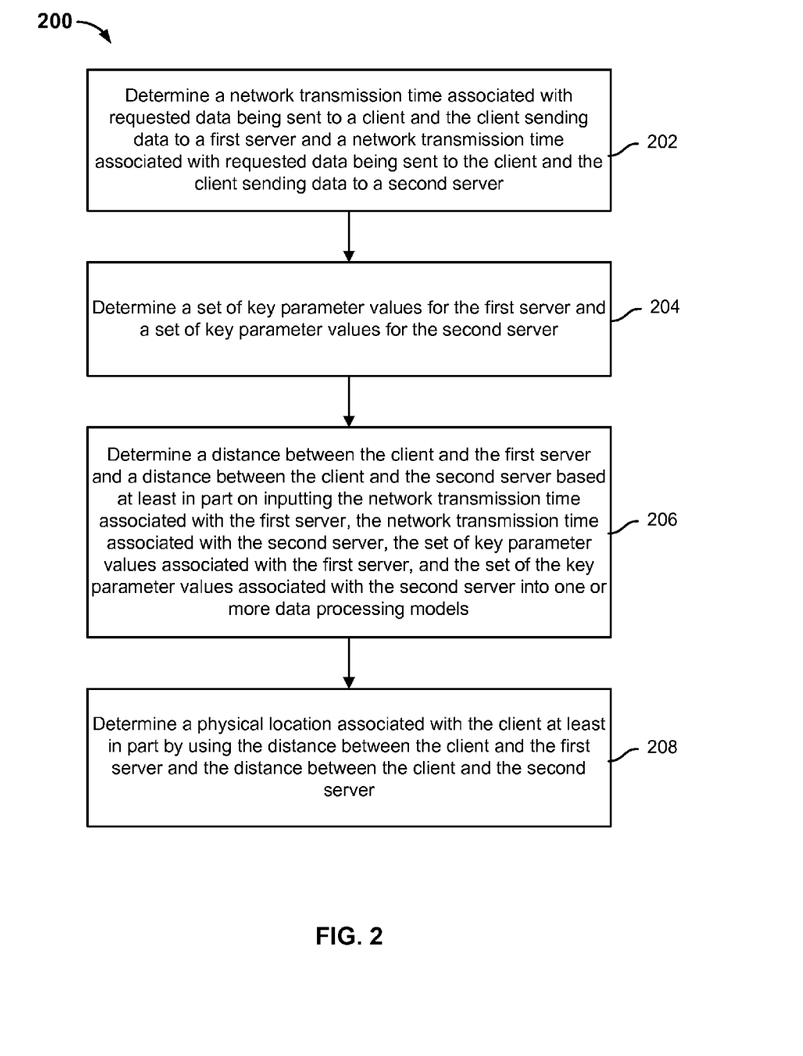
FIG. 2 is a flow diagram showing an embodiment of a process for determining a physical location of a network client.

FIG. 2 is a flow diagram showing an embodiment of a process for determining a physical location of a network client. In some embodiments, process 200 may be implemented at system 100.

Process 200 may be used to determine the physical location of a client using at least two servers, whose respective physical locations are known.

At 202, a network transmission time associated with requested data being sent to a client and the client sending data to a first server and a network transmission time associated with requested data being sent to the client and the client sending data to a second server are determined. In some embodiments, a network transmission time (or sometimes referred to as a "bi-directional network transmission time") refers to the length of time it takes for requested data that is sent from a server to be received at a client and then for another communication sent by the client (as caused by the requested data) to be received at the same or another server. It is assumed that the client and each of such servers have already negotiated data transmission policies, if appropriate. For example, a network transmission time may be determined by recording the start time at which requested data is sent from a server to a client, recording the end time at which a request message sent from the client (due to at least a portion of the requested data) is received at the same server or another server, and using the difference between the recorded start and end times as the network transmission time as the network transmission time associated with the server that received the request message.

For example, the determination of the network transmission times may be initiated by the client requesting data from a first server. For example, a user browsing a website at the client device may select an element that causes the client to request data from the first server, which is associated with supporting the website. In response to receiving the request, the first server may send back the requested data to the client and also record the start time at which the first server sent the data. Once the client receives the requested data, a mechanism associated with the requested data may cause the client to send a request message to both the first server and the second server. For example, such a mechanism may be positioning code that is configured to cause the client to send a request message to another server. Based on the content of the received request message, the first server and the second server are configured to record the time that the request was received from the client as the end time. Then either the first or the second server may communicate with the other server such that one such server (or a third server) may compute the difference between the start time and the end time associated with the first server as the bi-directional network transmission time that is associated with the first server and the difference between the start time and the end time associated with the second server as the bi-directional network transmission time that is associated with the second server.

Referring back to the example of FIG. 1, the client whose physical location is to be determined may be client 102, the first server may be server 104, and the second server may be server 106. Client 102 may request data from server 104 because, for example, a user browsing a website at client 102 may select an element at the website that causes client 102 to request data from server 104, which is associated with the website. In response to receiving the request from client 102, server 104 may send the requested data back to client 102 and also record the time at which it sends the requested data as the start time. For example, the requested data sent by server 104 may include computer code that causes client 102 to send a certain request to both server 104 and server 106. Once server 104 and server 106 each receives the request from client 102, each of server 104 and server 106 may record the time at which it received the request as the end time. Then, either server 104 or server 106 (or a third server) may compute the bi-directional network transmission time as the difference between the start and end times.

Because at least two coordinates, such as longitude and latitude or the three-dimensional coordinates x, y and z, are needed to locate the physical address of the client, the determination of the client's physical address comprises establishing an equation set that includes at least two equations. Therefore, the determination of the network transmission time requires the determination of the network transmission times between at least two servers with the same client.

At 204, a set of key parameter values is determined for the first server and a set of key parameter values is determined for the second server.

In some embodiments, each key parameter comprises a characteristic or feature of the network congestion status of a server that may affect the manner in which the server communicates with the client. For example, while a server is handling a lot of traffic as it receives the client's request, the server may take a longer time to respond to a client. In some embodiments, a server's network congestion status refers to the state of how busy the server is with processing network traffic (including engaging in data transmissions with the client) and may give further context to the determined bi-directional network transmission time (and help to correct the relationship of the distance between the server and the client to a related network transmission time).

In some embodiments, key parameters that may be used to characterize a server's network congestion status include the number of services that the server is configured to provide, the number of transactions processed by the server per second, the number of page requests received by the server per second, the day of the week when data transmissions occurred, and the system time at which the server received the request message from the client. The previously mentioned key parameters are merely examples and other key parameters may be used in place of or in addition to such key parameters. In some embodiments, the range of key parameters that might be considered is related to the desired precision with which the client's physical location is desired to be determined. If the precision requirements with respect to the determination of the client's physical location is low, then one or a few key parameters, such as those described above, may be selected. However, if the precision requirements with respect to the determination of the client's physical location is high, then more key parameters, such as all of those described above, may be selected.

Referring back to the example of FIG. 1, a set of key parameter values may be determined for server 104 by server 104 and another set of key parameters may be determined for server 106 by server 106 (i.e., each of servers 104 and 106 is configured to determine its own set of key parameters).

At 206, a distance between the client and the first server and a distance between the client and the second server is determined based at least in part on inputting the network transmission time associated with the first server, the network transmission time associated with the second server, the set of key parameter values associated with the first server, and the set of key parameter values associated with the second server into one or more data processing models.

For example, each of the one or more data processing models may comprise a statistical model or computer generated software model. The one or more processing models describe the relationship among the following: the distance between a server and a client, the key parameters, the times (e.g., day of the week and system time) during which the data transmission between the server and the client occurred, and the bi-directional network transmission time associated with the server and the client. By applying the key parameters of each server (e.g., which were computed by each server) to the data processing model(s), the data processing model(s) can be used to obtain the distances between each server and the client. In some embodiments, the one or more data processing models are built using a data classification technique and also trained on historical data. For example, the historical data samples used to train the one or more data processing models may comprise distances between various historical servers and various historical clients, network transmission times between historical servers and historical clients, and the key parameters corresponding to each historical server. In some embodiments, a data processing model may be built for each server and the data processing model may be trained on historical data associated with that server. In some embodiments, a data processing model may comprise a functional relation expression that mathematically relates the distance between a server and a client to the key parameters associated with the server, the times (e.g., day of the week and system time) during which the data transmission between the server and the client occurred, and the bi-directional network transmission time associated with the server and the client.

By feeding the determined key parameters and the determined network transmission time corresponding to the at least two servers into the data processing model(s), the model(s) may output the distance between the first server and the client and the distance between the second server and the client.

Referring back to the example of FIG. 1, the network transmission time associated with the total length of time that it takes for requested data sent from server 104 to be received at client 102 and for a request message sent by client 102 to be received back at server 104, the network transmission time associated with the total length of time that it takes for requested data sent from server 104 to be received at client 102 and for a request message sent by client 102 to be received at server 106, a set of key parameter values determined for server 104, and another set of key parameters determined for server 106 may be input into one or more data processing models so that the models may output the distance between client 102 and server 104 and another distance between client 102 and server 106.

At 208, a physical location associated with the client is determined at least in part by using the distance between the client and the first server and the distance between the client and the second server.

Because the physical location of each of the at least two servers is known, it is possible to determine the physical location of the client by solving a set of distance equations using the determined distances between the client and each of the first and second servers and the known physical locations of the at least two servers. In the event that the solution to this set of equations associated with the two distances is a unique value, the two coordinates corresponding to this unique value represent the physical coordinates of the client. However, in the event that the solution to this set of equations is not a unique value, then at least three servers is needed to be used to determine the physical location of the client, in which case using the at least three determined distances corresponding to each of the servers to the client may be able to uniquely determine the physical location of the client.

Figure 3:
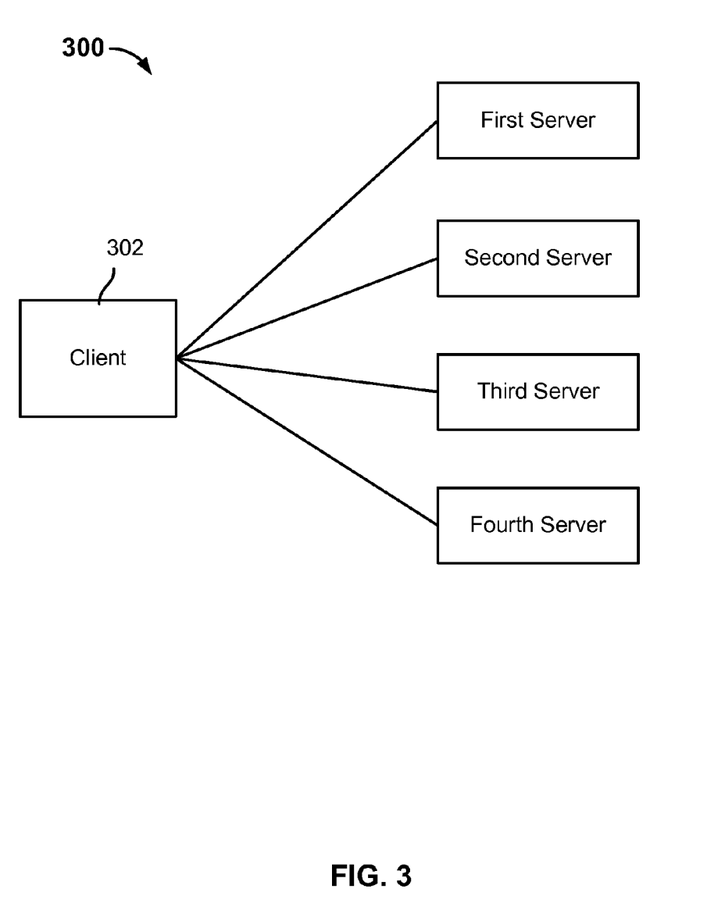
FIG. 3 is an example of a system of a client and four servers, each with a known physical location.
Figure 4:
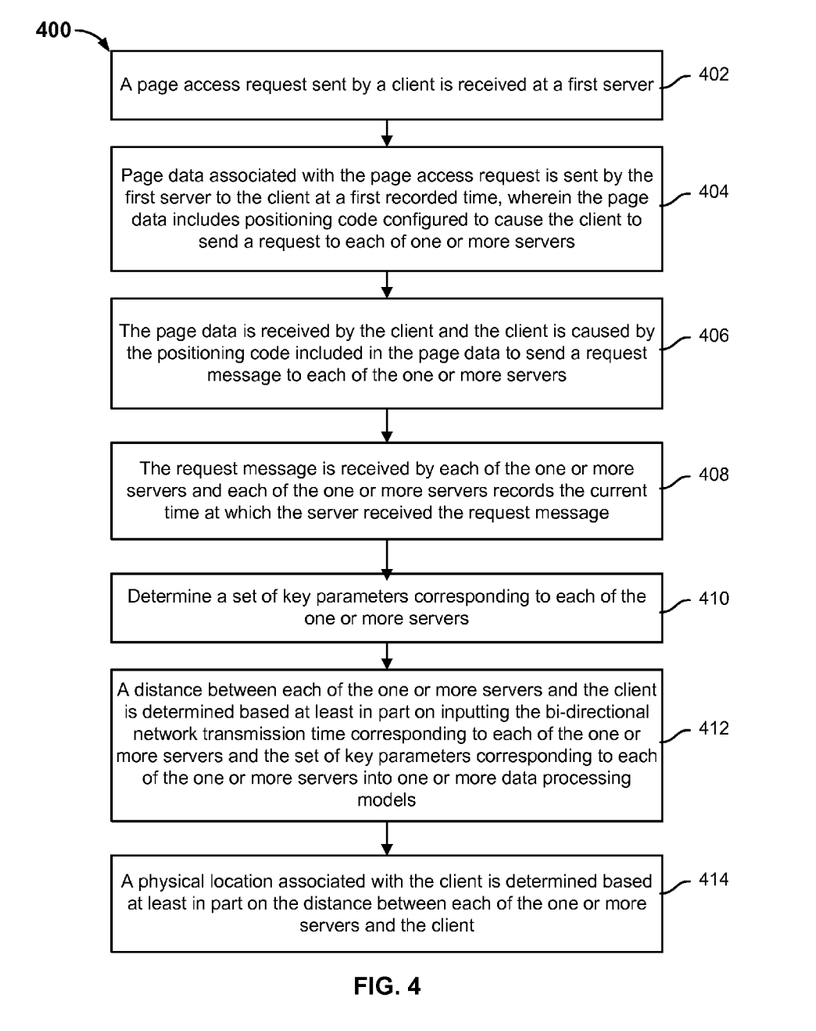
FIG. 4 is a flow diagram showing an example of a process for determining the physical location of a client using four servers, each of a known physical location.

Referring back to the example of FIG. 1, in the event that the set of equations using the distance between client 102 and server 104 and the distance between client 102 and server 106 does not yield a unique solution, then it is determined that the physical location of client 102 may not be determined using only server 104 and server 106, but that the physical location of client 102 may be determined using server 104 and server 106 and at least a third server. FIGS. 3 and 4 below discuss an example of determining the physical location of a client using at least three servers.

FIG. 3 is an example of a system of a client and four servers, each with a known physical location. In the example, client 302 may communicate with any of the first server, the second server, third server, or fourth server over a network comprising high-speed data networks and/or telecommunication networks. In some embodiments, client 302 may be remote to any of the first server, the second server, third server, or fourth server. In some embodiments, any of the first server, the second server, third server, or fourth server may communicate with clients other than client 302. The first server, second server, third server, and fourth server may each perform the same or at least somewhat different services. The physical location of each of any of the first server, the second server, third server, and fourth server is known.

Some embodiments of determining the physical location of client 302 will be described with process 400 of FIG. 4 below.

FIG. 4 is a flow diagram showing an example of a process for determining the physical location of a client using four servers, each of a known physical location. The example of process 400 may be used to determine the physical location of client 302 of system 300.

At 402, a page access request sent by a client is received at a first server.

Referring to the example of FIG. 3, a page access request sent by client 302 may be received by the first server of system 300. For example, client 302 may send a page access request when a user using client 302 makes a selection at a website associated with the first server that causes the request to be sent for more data (e.g., associated with a new web page) to be displayed at the client 302.

At 404, page data associated with the page access request is sent by the first server to the client at a first recorded time, wherein the page data includes positioning code configured to cause the client to send a request to each of one or more servers.

The first server then sends the requested page data back to client 302. Furthermore, when the first server completes sending the requested page data to client 302, the first server records the current system time as t1.

This page data that was sent back to client 302 includes positioning code. For example, the first server may add the positioning code to all of its page data in advance of receiving the page access request from client 302, or it can include the positioning code to the page data after it receives client 302's access request for a page.

This positioning code includes network address information associated with at least two servers. In the present example of process 400, the positioning code may include network address information (e.g., media access control addresses) associated with the second server, the third server, and the fourth server. In another example, the first server may be the same as one of the second server, third server, and fourth server, since there need only be three different servers of known physical locations to determine the physical location of the client.

In this example, the positioning code may be used as follows: when client 302 analyzes the requested page data received from the first server, the positioning code is triggered to cause client 302 to send request messages to each of the servers (the second server, the third server, and the fourth server) whose network address information is included in the positioning code. The request messages caused to be sent to each of the servers include code and/or instructions of another form that is configured to cause each of the receiving servers to perform the appropriate functions associated with determining the physical location of client 302. In some embodiments, to ensure that the positioning code is analyzed by client 302 earlier among the page data, the positioning code is included at the first position that is to be analyzed by client 302 among the page data.

At 406, the page data is received by the client and the client is caused by the positioning code included in the page data to send a request message to each of the one or more servers.

When client 302 receives and analyzes the page data, the positioning code is triggered and causes client 302 to send a request message to each of the second server, the third server, and the fourth server.

So that a server can differentiate between request messages sent from different clients, in some embodiments, client 302 may include information that uniquely identifies itself as client 302 into the request messages that it sends to each server.

At 408, the request message is received by each of the one or more servers and each of the one or more servers records the current time at which the server received the request message.

After the second server, third server, and fourth server have each received the request message, each server learns of each server's need to perform the functions associated with determining the physical location of client 302 based on the request message. In some embodiments, such functions associated with determining the physical location of client 302 include recording the time at which the server received the request message from client 302 and determining the bi-directional network transmission time using the first recorded time associated with when the page data was sent by the first server and the recorded time associated with when the server received the request message from client 302.

For example, when the second server received the request message from client 302, the second server recorded the current system time, t21. The second server can then compute and obtain the bi-directional transmission network time, $\Delta t2$, using the first recorded time associated with when the page data was sent by the first server, t1, and the recorded time associated with when the second server received the request message from client 302, t21. For example, the bi-directional transmission network time associated with the second server may be represented as $\Delta t2=t21-t1$.

Similarly, the third server may record the system time when the third server received the request message from client 302 as t31. The third server can then compute and obtain the bi-directional transmission network time, $\Delta t3$, using the first recorded time associated with when the page data was sent by the first server, t1, and the recorded time associated with when the third server received the request message from client 302, t31. For example, the bi-directional transmission network time associated with the third server may be represented as $\Delta t3=t31-t1$. Also, the fourth server may record the system time when the fourth server received the request message from client 302 as t41. The fourth server can then compute and obtain the bi-directional transmission network time, $\Delta t4$, using the first recorded time associated with when the page data was sent by the first server, t1, and the recorded time associated with when the fourth server received the request message from client 302, t41. For example, the bi-directional transmission network time associated with the fourth server may be represented as $\Delta t4=t41-t1$.

For example, the system time t1 recorded by the first server may be reported by the first server to the second server, the third server, and the fourth server to facilitate the other servers in determining their respective bi-directional transmission network times.

At 410, a set of key parameters is determined corresponding to each of the one or more servers.

As mentioned above, the set of key parameters associated with a server characterizes the network congestion status of that server while it is engaged in data transmission with the client. There may be multiple key parameters (features) that characterize the current network congestion status of a server. The key parameters used in the present example include the number of transactions processed by the server per second ($\Delta transaction_i/\Delta t_i$) (e.g., the number of commercial transactions processed per second by a commercial transaction website over a configured period of time $\Delta t_i$), the number of page requests received by the server per second ($\Delta pv_i/\Delta t_i$), the day of the week (e.g., network congestion status on Monday will be very different from Sunday), and the system time (e.g., network congestion status at 10:00 am will be very different from 10:00 pm).

In determining the corresponding values to the chosen key parameters, each server may compute the number of transactions processed per second by the server, the number of page requests received per second by the server at the time at which the server received the request message from client 302, and determine the day of the week and system time at which the server received the request message from client 302.

At 412, a distance between each of the one or more servers and the client is determined based at least in part on inputting the bi-directional network transmission time corresponding to each of the one or more servers and the set of key parameters corresponding to each of the one or more servers into one or more data processing models.

Prior to performing process 400, the one or more data processing models are built and trained on historical data. Such one or more data processing models characterize the relationship among the following: the distance S between the server and the client, the key parameters ($\Delta transaction_i/\Delta t_i$, $\Delta pv_i/\Delta t_i$, the times (e.g., day of the week and system times) when the data transmission between the server and the client occurred, and the bi-directional network transmission time $\Delta t$ between the server and the client). By inputting the key parameters ($\Delta \text{transaction}_i/\Delta t_i$, $\Delta \text{pv}_i/\Delta t_i$, and day of week and system times) and $\Delta t$, which were computed by each server, to the one or more data processing models, the models may output the distances between each respective server and the client.

One example process of building the one or more data processing models may use a typical data mining classification algorithm.

In one example, the training process of the classification may be performed using the C5 implementation of a decision tree. Specifically, an example of the training process can be as follows: Obtain known experimental data (e.g., historical data) such as the distance S between the server and the client, the bi-directional network transmission time $\Delta t$ between the server and the client to use as the training set to the one or more data processing models; determine the key parameters (e.g., $\Delta \text{transaction}_i/\Delta t_i$, $\Delta \text{pv}_i/\Delta t_i$, and day of week and system times) of the server in different time segments (characteristics/features selection process); train the data processing models (e.g., plug in S, $\Delta t$, and the key parameters and run the C5 implementation of the decision tree); and obtain the data processing model.

There are many kinds of algorithms that may be used to build the data processing model(s) and the C5 decision tree is only one such example. The model(s) obtained by training with the C5 decision tree is a black box such that the specific functional expressions are not known. Other known classification algorithms, such as a support vector machine (SVM) may also be used. The SVM technique may determine specific functional relationships. Assume that the variables are defined as follows: system time t, day of week, number of transactions processed by the server per second $\Delta \text{transaction}_i/\Delta t_i$, the number of page requests received by the server per second $\Delta \text{pv}_i/\Delta t_i$, bi-directional network transmission time $\Delta t$, and server-to-client distance S. Thus, during training of the one or more data processing models, a corresponding weight coefficient w is obtained for each such key parameter. For example, after the corresponding weight coefficient is determined for each such key parameter and network transmission time, the model that describes the relationship of the weighted key parameters for obtaining S for a particular server may be represented as the following functional relation expression: $S = w1*t + w2*\text{week} + w3*\Delta \text{transaction}_i/\Delta t_i + w4 \, \Delta \text{pv}_i/\Delta t_i + w5*\Delta t$.

After obtaining the weights for each of the key parameters, the relationship between server-client distance and network transmission time may be corrected by including key parameters that characterize network congestion status and network transmission time relationship and by weighting the impact of each key parameter and network transmission time based on the determined weights. Thus, in some embodiments, the client's physical location may be obtained more accurately than would be possible by relying solely on the S=VT method of calculation.

The training process comprises determining each value of w1, w2, w3, w4 and w5 based on the known (historical) S, t, week, $\Delta \text{transaction}_i/\Delta t_i$, $\Delta \text{pv}_i/\Delta t_i$, and $\Delta t$ values. Each key parameter may be determined to be of any exponential order, e.g., a key parameter may be determined to be squared or cubed, as in: $S = w1*(t \text{ squared}) + w2*(\text{week to the Nth power}) + w3*\Delta \text{transaction}_i/\Delta t_i + w4*\Delta \text{pv}_i/\Delta t_i + w5*\Delta t$. After determining the weight coefficients of each key parameter, the functional relation equation for this particular model may be determined. Once the functional relation expression is determined for a model, the expression may be used to determine the distance between a server and a client, S, given all the known values for the other key parameters and network transmission time (i.e., t, w, $\Delta \text{transaction}_i/\Delta t_i$, $\Delta \text{pv}_i/\Delta t_i$, and $\Delta t$) and their respective weights (e.g., w1, w2, w3, w4, and w5).

Returning to the example of system 300, a functional relation expression may be determined for each of the second server, the third server, and the fourth server. So to determine the S distance between client 302 and each server, the determined bi-directional network transmission time (e.g., $\Delta t$) and key parameters (e.g., t, w, $\Delta \text{transaction}_i/\Delta t_i$, $\Delta \text{pv}_i/\Delta t_i$) are plugged into the functional relation expression determined for that server. Assume that S2 represents the distance between the second server and client 302, S3 represents the distance between the third server and client 302, and S4 represents the distance between the fourth server and client 302. Such computations of S2, S3, and S4 may be performed at each respective server or at one designated server among the second, third, and fourth servers, or the designated server may be one other than the second, third, and fourth servers (and each server's set of key parameters and network transmission times may be sent over to the designated server for the designated server to perform the computations).

At 414, a physical location associated with the client is determined based at least in part on the distance between each of the one or more servers and the client.

For example, the physical location of each server comprises known three-dimensional (x, y, and z) geographic coordinates. An equation set can then be set up on the basis of the distances S2, S3 and S4 and the known physical locations (e.g., the known (x, y, z) coordinates) of the second, third, and fourth servers to determine the physical location of client 302. Even if each of the second, third, and fourth servers computed its respective S2, S3 and S4 values, the S2, S3 and S4 values (and the physical locations of each the of second, third, and fourth servers) may be sent to the designated server for the designated server to set up and solve the equation set to determine the physical location of client 302.

By using the various servers of known physical locations to communicate with a client with an unknown physical location, various key parameters or features may be extracted from the time associated with the client's communications and the server's respective network congestion status to determine the physical location of the client with more accuracy than using the IP address of the client to determine the client's physical location.

Figure 5:
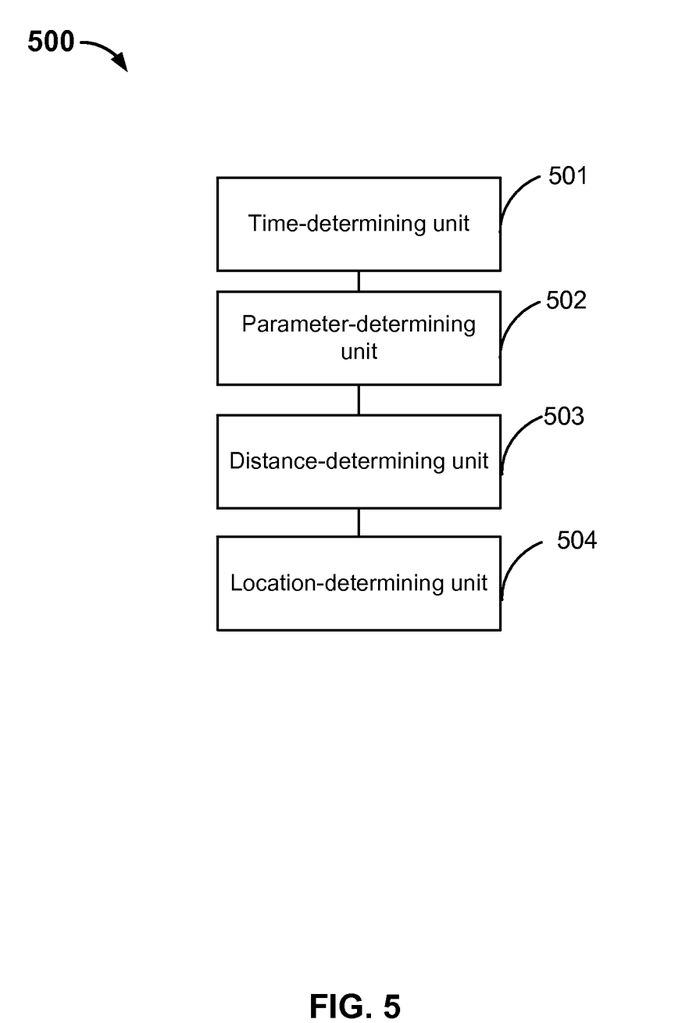
FIG. 5 is a diagram showing an embodiment of a system for determining the physical location of a client using various servers of known physical locations.

FIG. 5 is a diagram showing an embodiment of a system for determining the physical location of a client using various servers of known physical locations. In the example, system 500 includes time-determining unit 501, parameter-determining unit 502, distance-determining unit 503, and location-determining unit 504.

The modules, units, and subunits can be implemented as software components executing on one or more processors, as hardware such as programmable logic devices and/or Application Specific Integrated Circuits designed to perform certain functions, or a combination thereof. In some embodiments, the modules, units, and subunits can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules, units, and subunits may be implemented on a single device or distributed across multiple devices.

Time-determining unit 501 is configured to determine the network transmission times of at least two servers to the client based on the data transmission times between a client and the at least two servers.

Parameter-determining unit 502 is configured to obtain the set of key parameters of each of at least two servers, wherein the key parameters are selected to characterize the network congestion status of a server at the time that the server is engaged in data transmissions with the client.

Distance-determining unit 503 is configured to use one or more pre-built data processing models, the sets of key parameters corresponding to the at least two servers, and the network transmission times to compute the distances between each server and the client.

Location-determining unit 504 is configured to use the distances between each server and the client and the known physical location of each server to compute and obtain the physical location of the client.

In some embodiments, time-determining unit 501 is configured to first determine the network transmission times between two servers and the client. For example, network transmission times may be computed by recording separate data transmission start and end times after the client and servers have negotiated data transmissions with each other. It can also be as follows: time recording is triggered when the client makes a normal visit to a server and the server sends back access data to the client as a time that is recorded as the start time. Then receipt of the data by the client causes the client to send data transmission to this server and at least one other server, and this server and the other server records the data receipt time. Then each of the servers obtains the bi-directional network transmission time between the server and the client based on the start time and each of the server's own recorded data receipt times. After time-determining unit 501 obtains the network transmission time, parameter-determining unit 502 determines the values corresponding to various key parameters that characterize the network congestion status of each server during data transmissions conducted between the servers and the client, in order to give context to the relationship of the distances between the servers and the client and the network transmission time. Examples of key parameters that characterize network congestion status may include the number of transactions processed by the server per second, the number of page requests received by the server per second, the day of the week when the server received a communication from the client, and the server system time when the server received a communication from the client. After the key parameters have been determined, distance-determining unit 503 uses the key parameters of at least two, bi-directional network transmission times, and one or more pre-built data processing models to compute the distances between each server and the client. This pre-built data processing model is a data processing model which is computed and obtained by employing a data mining classification algorithm on known historical data. Distance-determining unit 503 inputs the key parameters of at least two servers and network transmission times into the data processing model comprising at least a functional relation expression to compute the distances between each server and the client. Lastly, location-determining unit 504 computes the client's physical location based on the distances between each server and the client and the physical location of each server.

Figure 6:
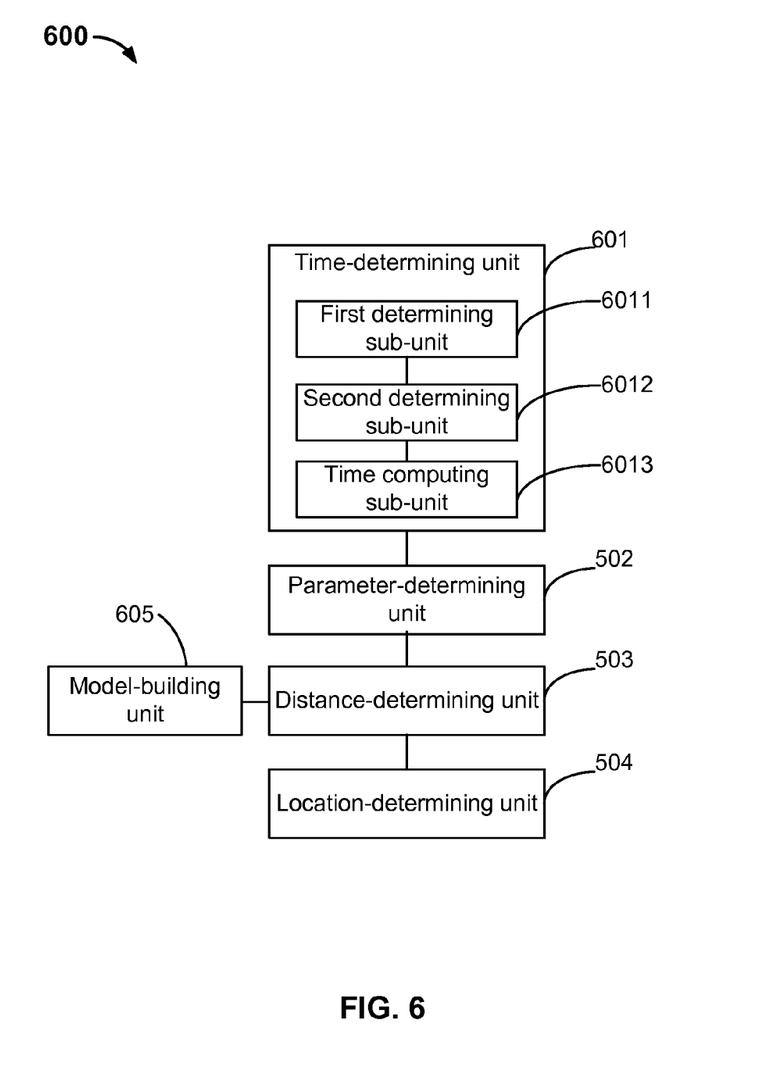
FIG. 6 is a diagram showing an embodiment of a system for determining the physical location of a client using various servers of known physical locations.

FIG. 6 is a diagram showing an embodiment of a system for determining the physical location of a client using various servers of known physical locations. In some embodiments, system 600 may be used alternatively to system 500.

Similar to system 500, system 600 also includes parameter-determining unit 502, distance-determining unit 503, and location-determining unit 504, as described above. Unlike system 500, system 600 includes time-determining unit 601, which will be described below, in place of time-determining unit 501 and additional model-building unit 605.

Time-determining unit 601 includes first determining sub-unit 6011, second determining sub-unit 6012, and time-computing sub-unit 6013.

First determining sub-unit 6011 is configured to determine a start system time for when a first server completes sending a first piece to the client. This first piece of data comprises a positioning code. The first positioning code comprises network address information on at least a second server such that, after receiving the first piece of data, the client is caused by the positioning code to send a second piece of data to at least the first server and the second server according to the network information in the positioning code. For example, the positioning code is located in a position of the first piece of data that is likely to be first analyzed by the client.

Second determining sub-unit 6012 is configured to determine a first end system time for when a second piece of data sent by the client is received by the first server and a second end system time for when a second piece of data sent by the client is received by the second server. The client is caused to send the second piece of data to the first server and the second server after analyzing the positioning code included in the first piece of data.

Time-computing sub-unit 6013 is configured for computing the difference between each of the first and second end system times and the first system time as the bi-directional network transmission time associated with the server and the client.

Model-building unit 605 is configured to use a data mining classification technique on known historical data to compute and obtain one or more data processing models. For example, the historical data comprises distances between historical servers and historical clients, network transmission times between historical servers and historical clients, and the key parameter values of historical servers. Because the network transmission times determined by the time-determining unit 601 are bi-directional network transmission times, the historical server-historical client network transmission times in the model-building unit 605 are also bi-directional network transmission times.

Time-determining unit 601 determines, via the three sub-units described above, the bi-directional network transmission times between the servers and the client. Moreover, after parameter-determining unit 502 determines the key parameters described above, distance-determining unit 503 performs server-client distance calculations based on the data processing model(s) built by model-building unit 605. Then, location-determining unit 504 computes the physical location of the client.

For convenience of description, when describing the device above, each module is described separately according to its function. Of course, during implementation of the present application, the functions of the various units may be achieved in the same or multiple software and/or hardware configurations.

As can be seen through the description of the embodiment above, persons skilled in the art can clearly understand that the present application can be realized with the aid of software plus the common hardware platform. Based on such an understanding, the technical proposal of the present application, whether intrinsically or with respect to portions that contribute to the existing technology, is realizable in the form of software products. These computer software products can be stored on storage media, such as ROM/RAM, diskettes, and compact discs, and include a certain number of commands used to cause a set of computing equipment (which could be a personal computer, server, or network equipment, etc.) to execute the methods described in the embodiments, or certain portions of the embodiments, of the present application.

Each of the embodiments contained in the present application is described in a progressive manner, and the descriptions thereof may be mutually referenced for portions of each embodiment that are identical or similar. The explanation of each embodiment focuses on areas of difference from the other embodiments. Particularly in regard to the device embodiments, because they are fundamentally similar to the method embodiments, the descriptions are relatively simple. Portions of the explanation of the method embodiment can be referred to for the relevant aspects. The device embodiments described above are merely illustrative. Units therein described as separate components may or may not be physically separate, and components shown as units may or may not be physical units, i.e., they may be located in one place, or they may be distributed onto multiple network units. A portion or all of the modules herein may be chosen based on actual requirements to achieve the objectives of the present application. Persons with ordinary skill in the art will be able to understand and implement it without expending creative effort.

The present application can be used in many general purpose or specialized computer system environments or configurations. For example: personal computers, servers, handheld devices or portable equipment, tablet type equipment, multiprocessor systems, microprocessor-based systems, set-top boxes, programmable consumer electronic equipment, networked PCs, minicomputers, mainframe computers, distributed computing environments that include any of the systems or equipment above, and so forth.

The present application can be described in the general context of computer executable commands executed by a computer, such as a program module. Generally, program modules include routines, programs, objects, components, data structures, etc. to execute specific tasks or achieve specific abstract data types. The present application can also be carried out in distributed computing environments; in such distributed computing environments, tasks are executed by remote processing equipment connected via communication networks. In distributed computing environments, program modules can be located on storage media at local or remote computers that include storage equipment.

The description above is only a specific means of implementing the present application. It should be pointed out that persons with ordinary skill in the art can, without departing from the principles of the present application, also produce a number of improvements and embellishments, and that such improvements and embellishments should also be regarded as within the scope of protection of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a physical location of a client, comprising:
one or more processors configured to:
determine a network transmission time associated with requested data being sent to the client and data sent from the client being received at a first server, and a network transmission time associated with requested data being sent to the client and data sent from the client being received at a second server;
determine a set of key parameters for the first server and a set of key parameters for the second server, wherein the set of key parameters for the first server comprises a set of one or more characteristics that describes a network congestion status of the first server and the set of one or more key parameters for the second server comprises a set of characteristics that describes a network congestion status of the second server, wherein the network congestion status of the first server affects at least a parameter measuring reception of the data sent from the client to the first server, and wherein the network congestion status of the second server affects at least a parameter measuring reception of the data sent from the client to the second server;
determine a distance between the client and the first server and a distance between the client and the second server based at least in part on inputting the network transmission time associated with the first server, the network transmission time associated with the second server, the set of key parameters for the first server, and the set of key parameters for the second server into one or more data processing models; and
determine the physical location associated with the client at least in part by using the distance between the client and the first server and the distance between the client and the second server; and
a memory coupled to the one or more processors and configured to provide the one or more processors with instructions.

2. The system of claim 1, wherein the network transmission time associated with the first server is determined based at least in part on a start time associated with sending requested data to the client and an end time associated with the first server receiving the data sent from the client.

3. The system of claim 1, wherein the network transmission time associated with the second server is determined based at least in part on a start time associated with sending requested data to the client and an end time associated with the second server receiving the data sent from the client.

4. The system of claim 1, wherein the set of key parameters for the first server includes one or more of the following: a number of transactions processed by the first server per second, a number of page requests received by the first server per second, a day of the week at which the first server received the data sent from the client, and a system time at which the first server received the data sent from the client.

5. The system of claim 1, wherein the set of key parameters for the second server includes one or more of the following: a number of transactions processed by the second server per second, a number of page requests received by the second server per second, a day of the week at which the second server received the data sent from the client, and a system time at which the second server received the data sent from the client.

6. The system of claim 1, wherein the requested data is configured to cause the client to send the data to the first server and to the second server.

7. The system of claim 1, wherein the requested data includes positioning code, wherein the positioning code is configured to cause the client to send the data to the first server and to the second server.

8. The system of claim 1, wherein the one or more data processing models includes at least a functional relation expression that relates at least one of a set of key parameters, a network transmission time, and a distance between a server and a client.

9. The system of claim 1, wherein determining the physical location associated with the client includes determining a set of equations using the distance between the client and the first server, the distance between the client and the second server, a physical location associated with the first server, and a physical location associated with the second server.

10. A method for determining a physical location of a client, comprising:
   determining a network transmission time associated with requested data being sent to the client and data sent from the client being received at a first server, and a network transmission time associated with requested data being sent to the client and data sent from the client being received at a second server;
   determining a set of key parameters for the first server and a set of key parameters for the second server, wherein the set of key parameters for the first server comprises a set of one or more characteristics that describes a network congestion status of the first server and the set of one or more key parameters for the second server comprises a set of characteristics that describes a network congestion status of the second server, wherein the network congestion status of the first server affects at least a parameter measuring reception of the data sent from the client to the first server, and wherein the network congestion status of the second server affects at least a parameter measuring reception of the data sent from the client to the second server;
   determining a distance between the client and the first server and a distance between the client and the second server based at least in part on inputting the network transmission time associated with the first server, the network transmission time associated with the second server, the set of key parameters for the first server, and the set of key parameters for the second server into one or more data processing models; and
   determining the physical location associated with the client at least in part by using the distance between the client and the first server and the distance between the client and the second server.

11. The method of claim 10, wherein the network transmission time associated with the first server is determined based at least in part on a start time associated with sending requested data to the client and an end time associated with the first server receiving the data sent from the client.

12. The method of claim 10, wherein the network transmission time associated with the second server is determined based at least in part on a start time associated with sending requested data to the client and an end time associated with the second server receiving the data sent from the client.

13. The method of claim 10, wherein the set of key parameters for the first server includes one or more of the following: a number of transactions processed by the first server per second, a number of page requests received by the first server per second, a day of the week at which the first server received the data sent from the client, and a system time at which the first server received the data sent from the client.

14. The method of claim 10, wherein the set of key parameters for the second server includes one or more of the following: a number of transactions processed by the second server per second, a number of page requests received by the second server per second, a day of the week at which the second server received the data sent from the client, and a system time at which the second server received the data sent from the client.

15. The method of claim 10, wherein the requested data is configured to cause the client to send the data to the first server and to the second server.

16. The method of claim 10, wherein the requested data includes positioning code, wherein the positioning code is configured to cause the client to send the data to the first server and to the second server.

17. The method of claim 10, wherein the one or more data processing models includes at least a functional relation expression that relates at least one of a set of key parameters, a network transmission time, and a distance between a server and a client.

18. The method of claim 10, wherein determining the physical location associated with the client includes determining a set of equations using the distance between the client and the first server, the distance between the client and the second server, a physical location associated with the first server, and a physical location associated with the second server.

19. A computer program product for determining a physical location of a client, the computer program product being embodied in a computer readable non-transitory storage medium and comprising computer instructions for:
   determining a network transmission time associated with requested data being sent to the client and data sent from the client being received at a first server, and a network transmission time associated with requested data being sent to the client and data sent from the client being received at a second server;
   determining a set of key parameters for the first server and a set of key parameters for the second server, wherein the set of key parameters for the first server comprises a set of one or more characteristics that describes a network congestion status of the first server and the set of one or more key parameters for the second server comprises a set of characteristics that describes a network congestion status of the second server, wherein the network congestion status of the first server affects at least a parameter measuring reception of the data sent from the client to the first server, and wherein the network congestion status of the second server affects at least a parameter measuring reception of the data sent from the client to the second server;
   determining a distance between the client and the first server and a distance between the client and the second server based at least in part on inputting the network transmission time associated with the first server, the network transmission time associated with the second server, the set of key parameters for the first server, and the set of key parameters for the second server into one or more data processing models; and
   determining the physical location associated with the client at least in part by using the distance between the client and the first server and the distance between the client and the second server.

* * * * *